(No Model.)
2 Sheets—Sheet 1.
G. W. CROSS.
BICYCLE SUPPORT.
No. 557,191. Patented Mar. 31, 1896.
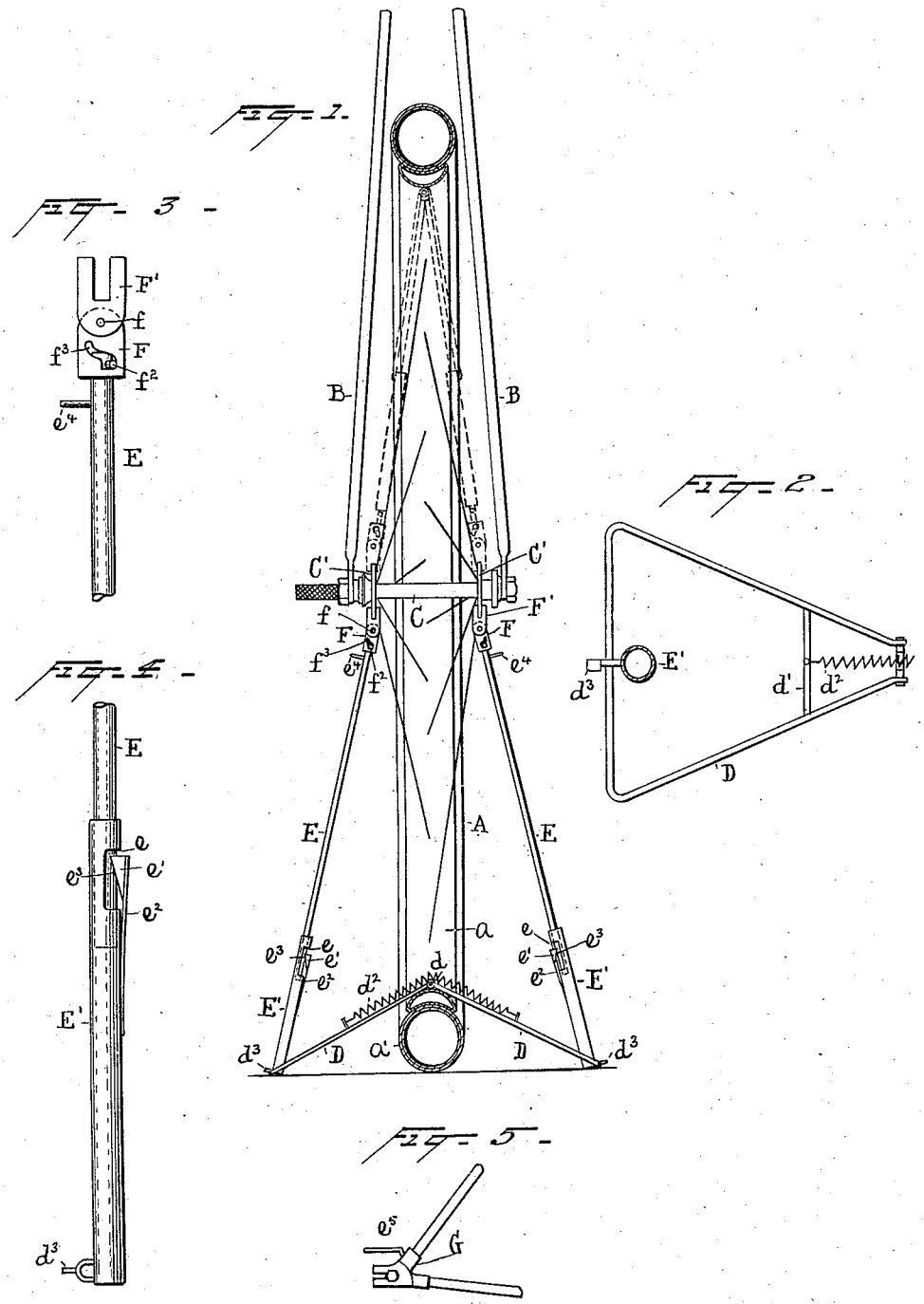
Witnesses
Norris A. Clark.
John R. Taylor.
Inventor
George W. Cross.
By his Attorneys
Dyer & Driscoll (No Model.)  2 Sheets—Sheet 2.
G. W. CROSS.
BICYCLE SUPPORT.
No. 557,191. Patented Mar. 31, 1896.
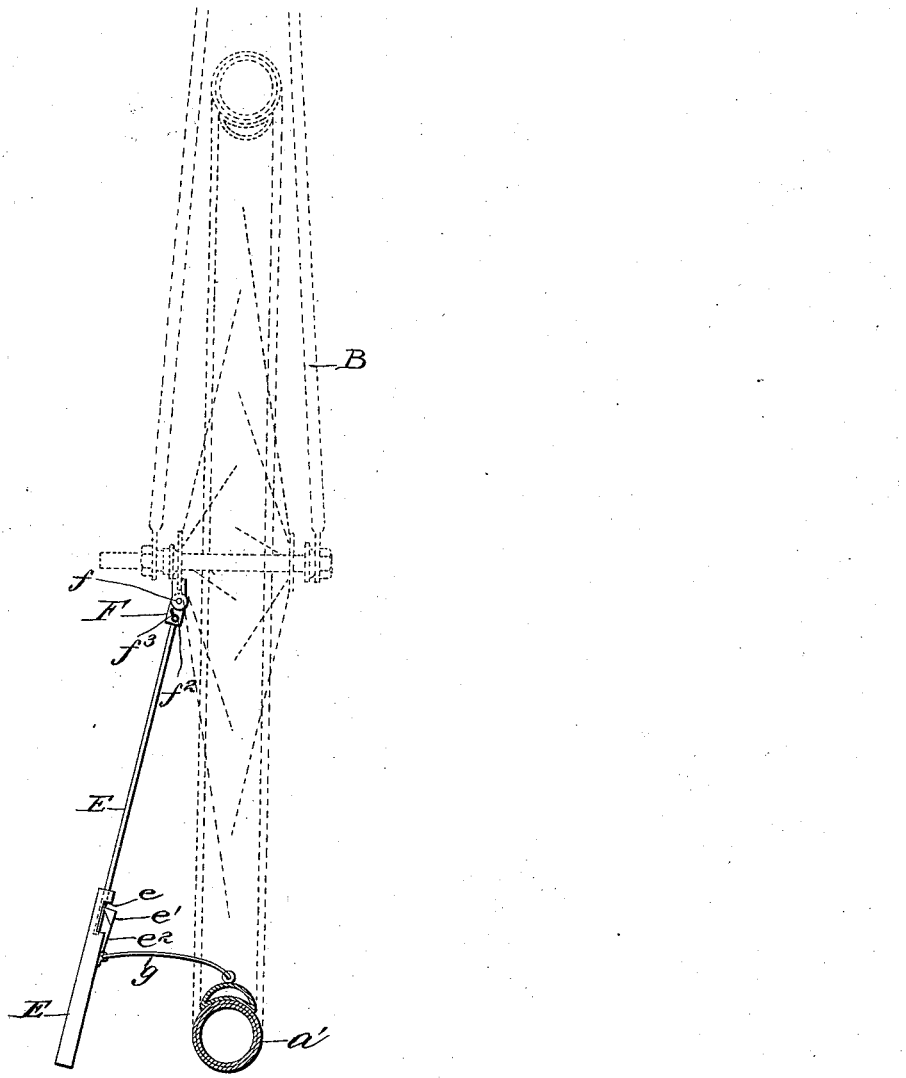

UNITED STATES PATENT OFFICE.

GEORGE W. CROSS, OF PITTSTON, PENNSYLVANIA.

BICYCLE-SUPPORT.

SPECIFICATION forming part of Letters Patent No. 557,191, dated March 31, 1896.

Application filed June 14, 1895. Serial No. 552,826. (No model.)

*To all whom it may concern:*

Be it known that I, GEORGE W. CROSS, a citizen of the United States, residing at Pittston, in the county of Luzerne and State of Pennsylvania, have invented a certain new and useful Improvement in Bicycle-Supports, of which the following is a specification.

My invention relates to an improvement in bicycle-supports, and has for its object the provision of automatically-adjusting mechanism carried by the bicycle, and adapted, when placed in an operative position, to support the same in a vertical, or approximately vertical, plane.

The invention further consists in so constructing such mechanism as that, after having been employed for the purpose of supporting the bicycle as aforesaid, it will, upon the forward movement thereof, automatically and without further adjustment by the rider be folded in such position as to revolve with one of the wheels.

In the practice of the invention I have found it desirable to arrange said mechanism to be carried by the rear wheel of the bicycle, although it may, if desired, be carried by the front wheel, and to maintain the bicycle through that medium by suitable supporting-feet placed either on one or both sides of said rear wheel, these supporting-feet bearing upon the ground, but being of such construction and so arranged as that immediately upon the forward motion of the machine said supports will leave the ground, and in the continuation of that movement and the consequent partial revolution of the wheel the mechanism will be carried around to a point where, through suitable means, it is caused to collapse or fold, and thereafter and until again needed it will maintain this position. When designed to be again brought into use, it is only necessary to adjust the mechanism as before by a simple movement of the hand or foot.

To these ends the invention consists in the construction, combination, and arrangement of parts substantially as illustrated in the drawings, in which—

Figure 1 is a rear elevation of a portion of a bicycle, part of the felly and tire being shown in section. Fig. 2 is an enlarged detail view of that portion of the support hereinafter termed the "foot." Figs. 3 and 4 are detail views, on an enlarged scale, of that portion of the support connecting the foot with the hub of the wheel. Fig. 5 is a detail of that portion of the frame which is mounted upon the axle of the rear wheel, and Fig. 6 a rear elevation of an obvious modification of the device.

Referring to the drawings, in which similar letters of reference denote corresponding parts, A designates the wheel of a bicycle. In the present instance this is the rear wheel and is of the ordinary construction in that it comprises a felly $a$ and tire $a'$.

B B designate the rear forks of the frame, these being mounted upon the axle C and extending upwardly to that member of the frame upon which the saddle is carried.

The spoke connections between the felly $a$ and the axle C are of the usual construction, such spokes being secured to the hub $C'$.

Turning now to the means for supporting the bicycle in an upright position, I shall describe a construction employing a support upon either side of the wheel, premising, however, with the statement that in practice it may be desirable to employ but a single one of these supports, such support being located upon one side only of the wheel. Referring to this construction, D D designate two supporting-feet, extending outwardly when the support is in operative position in such manner as that their ends will rest upon the ground. As here shown, these feet are approximately triangular in form and may be made, if desired, of spring metal. These feet are pivoted to the felly of the wheel preferably by means of a pin $d$ mounted in suitable bearings upon said felly. It is not essential, however, that these feet be pivoted in the manner described, as, if it is desired, in order to prevent weakening the felly by perforating it for the reception of the bearings of the pin $d$, a clamp conforming to the contour of the felly may be employed, having the bearing for the pin mounted thereon, a suitable set-screw being employed for the purpose of binding said clamp firmly upon the felly.

Each of the feet D D is preferably provided with a cross-bar $d'$, and from one of these cross-bars to the other extends a spring $d^2$, (here shown as a coil-spring,) the support being forced outwardly into operative position against the tension of this spring, and said spring operating to return the feet and the whole support to its normal position against the spokes of the wheel when the pressure by means of which the whole is placed in operative position is removed.

E E' designate telescoping supporting-rods connecting the feet with the hub of the wheel. Of these each of the latter, E', is pivotally secured to the outer member of the foot upon each side of the wheel. It is tubular in form and of such dimension relatively to the diameter of the rod E as that the latter may project entirely therethrough when the support is folded into inoperative position. Each member E' is provided near its outer end with a recess $e$ and with a lock $e'$, (here shown as triangular in form and maintained in position by means of a spring $e^2$,) this lock coacting with a notch or depression $e^3$ near the end of the rod E. The pressure of the spring $e^2$ is inward, so that, the rod E having been brought to the position illustrated in Figs. 1 and 4 of the drawings, the lock will be caused to spring inwardly and engage with the notch or recess $e^3$, thereby maintaining the parts in that relation.

Each rod E is provided at its upper end with a bearing F, in which it has a vertical adjustment, said bearing being secured to the hub C' by means of a pin $f$, by which it is hinged to the clamp F'. Inside the bearing F the upper end of the rod E is provided with a pin or spur $f^2$, which coacts with a recess $f^3$ in said bearing, said pin and said recess operating in the manner of a bayonet-joint. The rod E is also provided, preferably at a point near the bearing F, with an outwardly-extending pin $e^4$, this pin being adapted to coact with a guard $e^5$ secured upon the bearing G, by means of which the frame of the bicycle is mounted upon the wheel, the purpose of which construction will be hereinafter set forth.

$d^3$ designates a foot-piece secured to, or, if desired, forming a part of the foot D, this foot-piece being so constructed and arranged as that when the support is in inoperative position it will lie against the side of the wheel.

The operation of the invention is as follows: The normal position of the support is, of course, its inoperative position. In this position the rods E E' have been telescoped; and the support carried by the wheels against the spokes thereof, as shown in dotted lines in Fig. 1. When it is designed to bring the support into operative position to maintain the wheel at a perpendicular, it is only necessary to place the foot either upon the foot-piece $d^3$ upon either support D, or upon the outer member thereof, and press the same downwardly to the ground, this movement being accomplished against the tension of the spring $d^2$. When the rod E has passed through the tube E' a sufficient distance to allow the feet D to touch the ground upon either side of the wheel, the notch or recess $e^3$ is brought into engagement with the spring-lock $e'$, whereby said rods and said tubes are maintained in that relation. During this movement, also, each rod E, theretofore turned in such position as that the pin $f^2$ will occupy its highest position in the recess $f^3$ in the bearing F, will be turned so that these parts will assume the relation shown in detail in Fig. 3, the pin being in the lowermost portion of said recess, and the pin $e^4$ extending outwardly in the path of the guard $e^5$. The parts being therefore locked in the position illustrated in Fig. 1, the bicycle will, of course, be supported in an upright position. Now if it were necessary to return the support to its normal and inoperative position by hand, this of course would occasion inconvenience and loss of time. By means of the construction described, however, this operation is performed automatically during a partial revolution of the wheel to which said support is secured. The rider may, while the support is in the position shown in Fig. 1, mount the bicycle and start the machine forward. Almost immediately upon the commencement of the forward motion the supports D will leave the ground and be carried around by the wheel during a portion of its revolution. When the wheel has revolved sufficiently to bring the pin $e^4$ into engagement with the guard $e^5$, the latter, by contact with the former, will give to the rod E a partial turn or revolution, whereby the notch or recess $e^3$ will be disengaged from the spring-lock $e'$, and the pin $f^2$ carried by the end of the rod E will be pressed upwardly in the recess $f^3$. In this position, the locking mechanism being disconnected, the spring $d^2$ is free to act, and its action is such that the feet D are brought upwardly, each rod E telescoped in each tube E' and the whole support collapsed and pressed against the spokes of the wheel in the position shown in dotted lines in Fig. 1, every part of the mechanism being out of such a path of rotation as would cause it to interfere with either the guard $e^5$ or the frame B of the bicycle.

As will be readily understood, when next the support is brought into operative position to maintain the wheel at a perpendicular, the rod E will be returned to the position which it occupied before striking the guard $e^5$.

I do not wish to be limited to the details of construction herein shown and described, as obviously these may be varied in many respects without departing from the spirit of the invention. For instance, as heretofore stated, the support may be located upon one side only of the wheel. Such a construction is shown in Fig. 6, to which attention is directed. In this modification I have dispensed with a separate foot, as before described, and allow the lower end of the tube E' to answer as a foot for the support of the machine. I have also dispensed with the coiled spring $d^2$ and have employed instead a single leaf-spring $g$, which connects the rim of the machine with the tube E'. This leaf-spring not only serves by reason of its elasticity to move the support out of its operative position when the lock e' is disengaged, but also acts as an effective brace for the support when it is in its operative position.

It is of course understood that the locking mechanism and the means for turning the rod E may be varied, if desired, I having shown herein but a single form of such mechanism and means which are capable of producing the desired result.

I claim—

1. A bicycle-support, comprising a foot or support carried by and rotating with the wheel of the bicycle, and movable outwardly for engagement with the ground when in operation, a lock for maintaining said foot or support in such operative position, and an element on the bicycle-frame with which said lock coöperates when the wheel is partially rotated, whereby the said lock will be disengaged and the foot or support be free to move out of its operative position, substantially as set forth.

2. A bicycle-support comprising a foot or support carried by and rotating with the wheel of the bicycle and movable outwardly for engagement with the ground when in operation, a spring connecting with said foot or support, tending to normally withdraw the same out of its operative position; a lock for maintaining said foot or support in its operative position; and an element on the bicycle-frame with which said lock coöperates when the wheel is partially rotated, whereby the said lock will be disengaged and the foot or support be moved out of its operative position by the tension of said spring, substantially as set forth.

3. A bicycle-support comprising a foot hinged to the rim of the wheel, a telescoping connection between the free end of said foot and the hub of the wheel, a lock carried by said connection for maintaining the parts in operative relation and a stop on the bicycle-frame for engaging with and releasing said lock when the wheel revolves, substantially as set forth.

4. A bicycle-support comprising a foot hinged to a wheel and rotating with the same, mechanism for maintaining said foot in operative position when the wheel is stationary, and a stop on the bicycle-frame for automatically releasing said mechanism and restoring the foot to inoperative position upon the rotation of the wheel, substantially as set forth.

5. In a bicycle-support, the combination with a wheel, of a foot hinged to the rim of said wheel, a tube pivotally connected with the free end of said foot, a rod operating in said tube and connected with the hub of the wheel, means for locking said rod in said tube when the support is in an operative position, and means for disengaging said lock and restoring the support to inoperative position, substantially as set forth.

6. In a bicycle-support, the combination with a wheel, of a foot pivoted to the wheel-rim, a tube pivotally connected therewith, a rod operating in said tube and adjustably connected with the hub of the wheel, a lock for maintaining the support in operative position, and releasing mechanism brought into action by the revolution of the wheel, whereby said support is collapsed and restored to inoperative position, substantially as set forth.

7. In a bicycle-support, the combination with a wheel, of a foot hinged thereto, a tube pivotally mounted upon said foot and carrying locking mechanism, a rod connected at its upper end with the wheel and with its lower end operating in said tube, and means carried by the frame coöperating with said rod whereby the revolution of said wheel will disengage said lock and restore the support to inoperative position, substantially as set forth.

8. In a bicycle-support, the combination with a wheel, of a foot hinged thereto, a tube pivotally mounted upon said foot and carrying locking mechanism, and a rod connecting at its upper end with the wheel and with its lower end operating in said tube, said rod carrying a pin adapted to coact with a guard carried by the frame of the bicycle to release said lock and restore the support to inoperative position, substantially as set forth.

9. In a bicycle-support, the combination with a wheel, of a foot hinged to the rim thereof, a tube pivotally mounted upon the free end of said foot and carrying locking mechanism, a rod having at its upper end an adjustable bearing by means of which it is secured to the hub of the wheel, and means for releasing the locking mechanism and returning the support to its normal position, substantially as set forth.

This specification signed and witnessed this 8th day of June, 1895.

GEORGE W. CROSS.

Witnesses:
EUGENE CONRAN,
S. O. EDMONDS.